United States Patent [19]

Ouellette

[11] 4,382,490
[45] May 10, 1983

[54] DRIVE TRAIN APPARATUS

[75] Inventor: Joseph F. Ouellette, Glendale, Mo.

[73] Assignee: Ouellette Machinery Systems, Inc., Fenton, Mo.

[21] Appl. No.: 76,479

[22] Filed: Sep. 17, 1979

Related U.S. Application Data

[63] Continuation-in-part of Ser. No. 950,280, Oct. 11, 1978.

[51] Int. Cl.³ .............................................. B66B 1/00
[52] U.S. Cl. ....................................... 187/32; 187/17; 187/29 R; 192/0.098; 184/27 R
[58] Field of Search .................. 187/17, 9 R, 9 E, 38, 187/39, 32, 29 R; 318/46, 67; 184/26, 27 R, 32; 192/0.02 R, 0.098; 74/665 A

[56] References Cited

U.S. PATENT DOCUMENTS

| | | | |
|---|---|---|---|
| 1,460,569 | 7/1923 | Brodesser | 187/32 |
| 2,771,790 | 11/1956 | Munschauer | 192/0.098 |
| 4,042,069 | 8/1977 | Ohira et al. | 187/29 R |
| 4,122,919 | 10/1978 | Anzai | 187/29 R |

Primary Examiner—Joseph J. Rolla
Assistant Examiner—Kenneth Noland
Attorney, Agent, or Firm—Rogers, Eilers & Howell

[57] ABSTRACT

A drive train includes a rotating shaft driven element of a materials handling device with two drive motors separately coupled to the drive shaft to provide a slow and fast traverse speed and thereby increase the throughput of the machine. A brake mounted on the rotating drive shaft allows exact positioning of the element. The drive shaft drives a gearbox with an automatic oiler to provide a measured application of oil to a bearing not lubricated by the oil bath of the gearbox reservoir. The automatic oiler includes a single action cylinder which sumps oil from the reservoir of the gearbox and which is connected in a slave relationship to any other repetitive function in the materials handling device. A counterweight attached to the piston rod automatically resets the cylinder after each operation. A method within the operation is recited for moving a rotated shaft driven element from a first position to a home position with the drive train apparatus disclosed.

10 Claims, 3 Drawing Figures

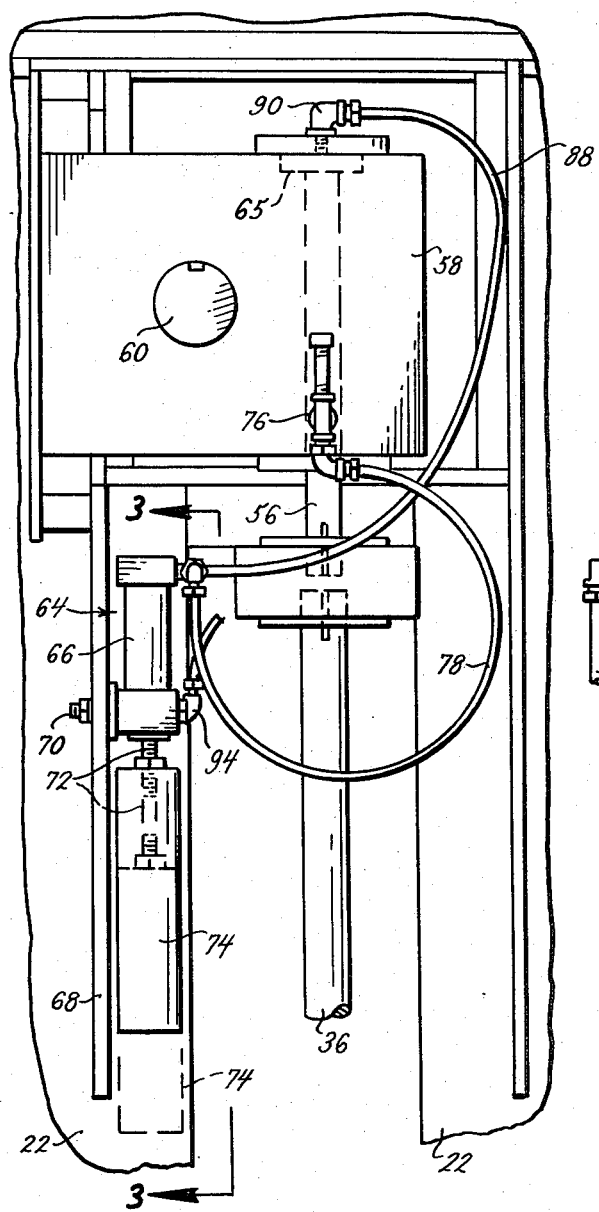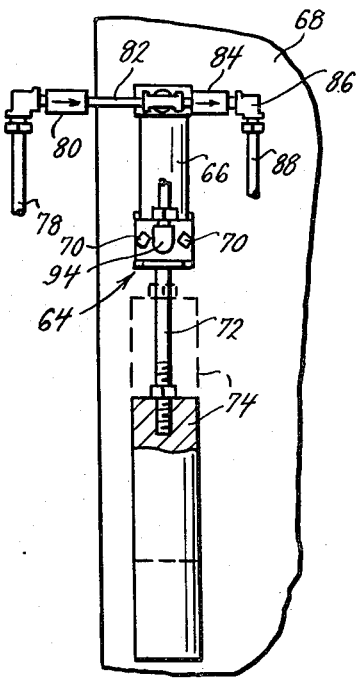

DRIVE TRAIN APPARATUS

BACKGROUND AND SUMMARY

This application is a continuation-in-part of Ser. No. 950,280 filed Oct. 11, 1978.

That application discloses a top feeding and ejecting materials handling device and method for loading or unloading pallets using rotating shaft driven elevators for transporting pallets. Applicant's parent application referenced above is incorporated herein by reference.

On this machine, as in other materials handling machines, the throughput of the machine or its rate of handling material is generally limited by the time required to make a transition from a finished piece of material to the next. For example, in applicant's parent application, the throughput of the de-palletizer is limited by the time required to discharge an empty pallet and bring a full pallet into position for indexing into the operator's work area. Thus, the speed of the rotating shaft driven elevators becomes a critical limiting factor at the higher operating speeds.

Merely increasing the speed of the elevator beyond a limited range creates problems and therefore fixes the top operating speed of the prior art one speed elevator. As the elevator speed increases, it becomes more difficult to slow the elevator down and position it repeatedly in a fixed "home" position to ensure uniform operation. Also, dissipating the increased force becomes troublesome and may result in the machine actually pounding itself out of alignment and causing a shutdown. Or, it may require the installation of high capacity shock absorbers and the like which increase the time required to home the elevator and thus defeat the reason for increasing the travelling speed.

Most, if not all, materials handling devices utilize gear motors and separately mounted gearboxes for transforming drive speeds of motors to the various drive speeds required for different movements within the device. Most of these gearboxes and the gear motors have bearings which require that they be immersed in oil or periodically oiled to ensure that they provide reliable operation and long life. However, whenever a drive shaft is mounted in a non-horizontal plane, it is possible for one of the bearings supporting the drive shaft to be out of contact with the oil bath contained in the gearbox or gear motor and thus not receive lubrication. In the past, it was required that a separate oil fitting be mounted to each of these bearings and regular maintenance required to provide these bearings with lubrication. Unfortunately, the tendency was to increase the time between oilings and also increase the amount of oil applied so that the bearing eventually clogged with excess oil, accumulated dirt and would prematurely fail. Or, more often, the bearing was simply ignored and replaced when it failed which greatly increased the down time for the entire machine and was wastefully expensive. As can be appreciated, neither of these solutions has been found to be satisfactory.

Applicant has succeeded in developing a unique drive train which provides reliable two speed operation to increase the traverse time of any moving element and eliminates the problems of the prior art in positioning and stopping the moving element. In addition, applicant's drive train provides an automatic oiling mechanism which repeatedly applies a measured application of oil during each operation and with an automatic resetting device that is fail safe. Applicant's new drive train includes two motors, one being connected to drive a rotating shaft at a substantially faster speed than the second motor, with the rotating shaft driving a gearbox which includes applicant's automatic bearing oiler. The bearing oiler has a cylinder with a vertically disposed piston and piston rod, a reset or counterweight attached to the piston rod, oil lines extending from the oil bath of the gearbox to the cylinder and on to the bearing with check valves in each line to eliminate back sumping of the oil. The cylinder may be connected in a slave relationship with any other automatic function of the machine such that a measured amount of oil is repeatedly applied to the non-immersed bearing. The cylinder is a single action cylinder and the counterweight resets the cylinder automatically by gravity whenever the automatic master function finishes its operation.

The two motor drive for the rotating shaft solves the problems of the prior art by providing a fast traverse speed for an elevator or other moving element for the majority of its travel and the second motor may be automatically switched in to dynamically slow down the elevator with the back EMF of the second slower motor and also eliminate the pounding into home position associated with higher speeds of travel. A brake is mounted on the rotating shaft to ensure accurate positioning of the elevator and to prevent slippage with both the traverse motors are sequenced off. Any type of sensing means such as microswitches, limit switches, photoelectric cells, and the like may be used to sense the location of the elevator and these may be adjusted to coordinate the speeds of the motors and ensure sufficient slow down before stopping with maximum travel at high speed. The use of two motors enables a rapid change in relative speeds of the two modes of elevator travel which also allows adjustability of the throughput capability of the machine. The pulleys may be easily replaced and their size adjusted to effect this change in relative speed. Thus, the machine may be easily adapted for use at different process line machines and with different types of products which might require different combinations of fast and slow speeds to ensure proper operation. These and other advantages may be more fully understood by referring to the drawings and the description of the preferred embodiment which follows.

BRIEF DESCRIPTION OF THE DRAWINGS

FIG. 2 is an enlarged view of the output gearbox and automatic bearing oiler;

FIG. 3 is a partial side view of the bearing oiler.

DETAILED DESCRIPTION OF THE PREFERRED EMBODIMENT

Figure 1:
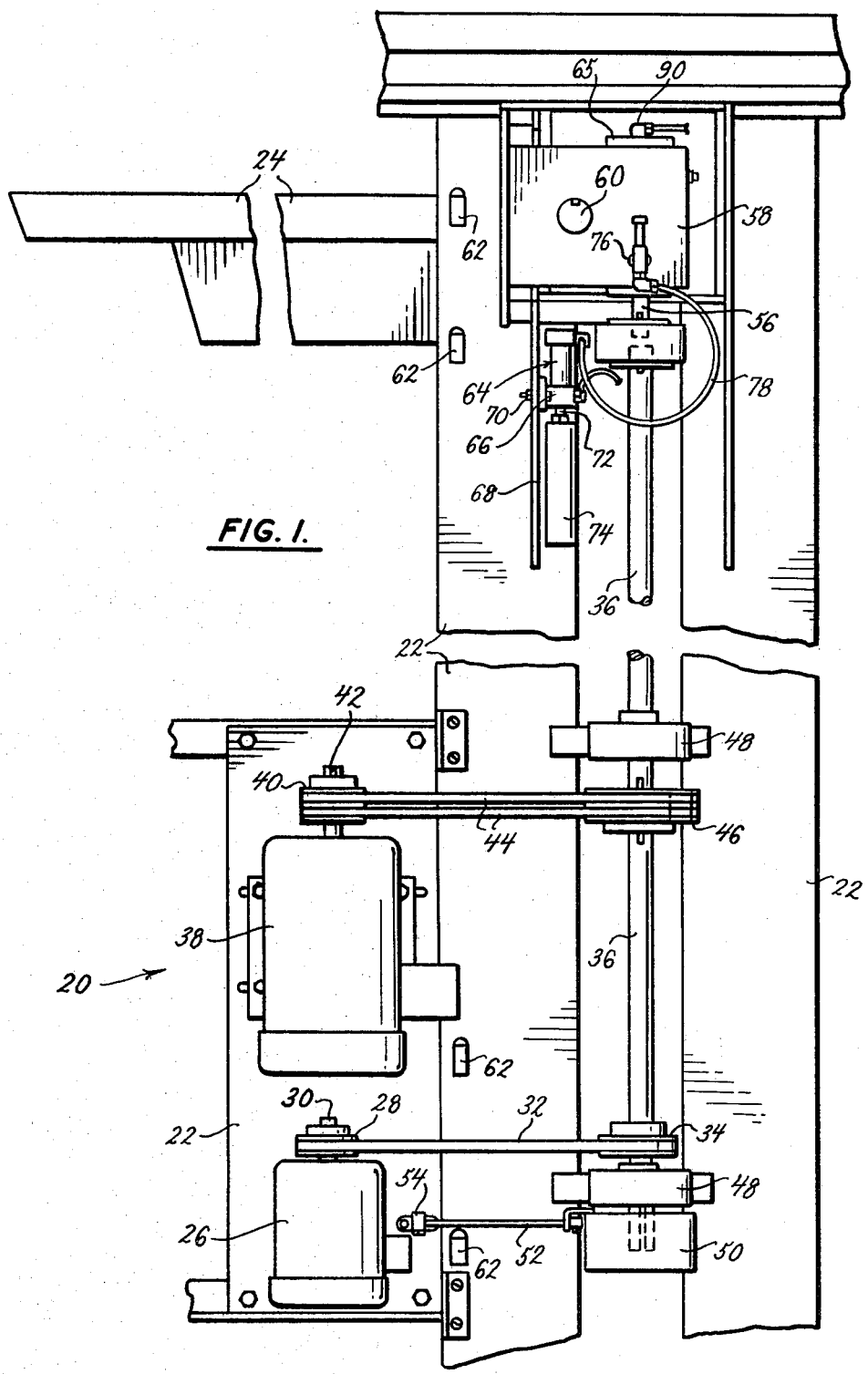
FIG. 1 is an elevational view of the drive train assembly with an automatic bearing oiler mounted on an output gearbox.

Applicant's drive train assembly 20 is shown in FIG. 1 mounted on a frame 22 and positioned to drive an elevator 24 up and down inside frame 22. A first motor 26 is mounted on frame 22 and has a pulley 28 mounted on its output shaft 30 with a drive belt 32 connecting it to a corresponding pulley 34 mounted on rotating drive shaft 36. A second motor 38 is similarly mounted on frame 22 with a double pulley 40 mounted on its output shaft 42 and drive belts 44 extending between double pulley 40 and a corresponding double pulley 46 mounted on rotating drive shaft 36. Clutches (not shown) may be used to connect and disconnect the motors 26, 38 from the output pulleys 28, 40, as is known in the art. Support bearings 48 support the rotating drive shaft 36 from frame 22. An electromagnetic brake 50 is mounted to the lower end of rotating drive shaft 36 and a torque rod 52 extends between brake 50 and the frame 22 to eliminate torquing of the brake 50 about drive shaft 36 as brake 50 is applied.

Rotating drive shaft 36 is coupled to shaft 56 of gearbox 58 and drives elevator drive shaft 60 therethrough. A chain drive (not shown) or the like may then be used to drive elevator 24 up and down within frame 22. Photoelectric cells 62 are mounted to frame 22 and are used to sense the position of elevator 24 as it traverses from its "home" position to its "discharge" position and also a preselected distance from each of these two positions. Light sources (not shown) as is known in the art for each of the photoelectric cells 62 are mounted on the opposite side of frame 22 and the photoelectric cells 62 operate a relay (not shown) as the elevator 24 breaks the light beam from the light source to the photoelectric cells 62.

The automatic bearing oiler 64 is mounted to frame 22 and may be used to oil any of the bearings of gearbox 58, but most especially the non-immersed bearing 65. The automatic bearing oiler 64 is shown more fully in FIGS. 2 and 3. Referring to FIG. 2, a pneumatic single action cylinder 66 is vertically disposed and mounted to frame member 68 by bolt assembly 70. A piston rod 72 extends downwardly and counterweight 74 is threaded thereon. A fitting 76 taps into gearbox 58 below the oil level and oil line 78 extends therefrom to a first check valve 80 as is best shown in FIG. 3. A nipple 82 extends between the first check valve 80 and the input side of cylinder 66. A second check valve 84 is "nippled" to the output side of cylinder 66 and an elbow fitting 86 connects to oil line 88 which extends to the upper oil fitting 90 near upper bearings 65 of gearbox 58. A pneumatic fitting 94 provides a connection point for a pneumatic control line (not shown) used to operate cylinder 66.

OPERATION

Referring to FIG. 1, the drive train assembly 20 is shown and will be explained in connection with the elevator of applicant's parent application, referred to above. However, this illustration is given for purposes of understanding only one embodiment of applicant's invention and it is to be understood that this is illustrative only.

As shown in FIG. 1, applicant's drive train assembly 20 may be used to move an elevator 24 from a home position at the top of frame 22 to a discharge position at the bottom of frame 22 as determined by the location of photoelectric cells 62. The first motor 26 may be a three quarter horsepower 1725 rpm motor and pulleys 28, 34 may be the same size such that rotating drive shaft 36 is driven at 1725 rpm. Second motor 38 may be a three horsepower 1140 rpm and double pulleys 40, 46 may be sized in a 1:2 ratio such that second motor 38 drives rotating shaft 36 at 575 rpm. An elevator 24 holds a pallet which may be filled with product, it is indexed downwardly one stack at a time until the full pallet load is stacked thereon. At that time, second motor 38 may slowly drive elevator 24 downwardly until it reaches the discharge position and the full pallet is discharged onto an output conveyor. At this point in the process, it becomes important to return elevator 24 to its home position as rapidly as possible so that it may accept the next pallet before the first stack of product has been completed. Thus, first motor 26 may be used to drive drive shaft 36 at a rapid speed (approximately three times) that of second motor 38 until elevator 24 reaches photoelectric cell 62 near its home position. At this point, almost all of the travel has been at the high rate of speed but it is nearing its home position and must be slowed down to avoid banging against supporting members and also to ensure reliable positioning. Thus, at this point second motor 38 is electrically energized and first motor 26 is turned off so that a dynamic braking effect is immediately applied to rotating drive shaft 36. This effect is caused by the back EMF and torque developed in second motor 38 and provides a smooth transitional slow down between speeds. When elevator 24 reaches its home position as sensed by photoelectric cell 62, second motor 38 may be shut down and brake 50 applied to lock the shaft 36 and position elevator 24 at the proper location. Thus, one mode of operation has been described for applicant's drive train assembly 20 in one particular environment.

Simultaneously with the operation of various other parts of the materials handling device, pneumatic operations are actuated on a repetitive basis, such as aligning pallets in a stack by pusher bar assemblies and the like. These operations are repeated on a regular basis and any one of which may be tapped into to control cylinder 66 through pneumatic fitting 94. When cylinder 66 is operated, drive shaft 72 is pushed upward and check valves 80, 84 are one way valves which force the flow of oil from the reservoir of gearbox 58 up through oil lines 78, 88 and into upper bearing 65 through oil fitting 90. When the pneumatic operation connected in a master relationship to the slave action of cylinder 66 is sequenced off, counterweight 74 pulls down piston rod 72 and sumps more oil into cylinder 66 in preparation for the next stroke.

There are various changes and modifications which may be made to applicant's invention as would be apparent to those skilled in the art. However, any of these changes or modifications are included in the teaching of applicant's disclosure and he intends that his invention be limited only by the scope of the claims appended hereto.

What is claimed is:

1. In a materials handling device having an element driven by a rotating shaft from a first position to a second position, the improvement comprising a first motor operatively coupled to the rotating shaft, a second motor operatively coupled to the rotating shaft, said first motor having means to drive said rotating shaft substantially faster than said second motor, means to sense when the element reaches a preselected distance from said second position, means to sense when the element reaches the second position, a brake mounted to the rotating shaft, and means to control said motors and brake so that the first motor drives a rotating shaft until the element reaches the preselected distance, the second motor drives a rotating shaft from the preselected distance to the second position, and the brake stops the rotating shaft when the element reaches the preselected distance, wherein an oil lubricated gear box having a level of oil and having bearings is driven by said rotating shaft and further comprising an automatic bearing oiler for said gear box including a cylinder, a supply line tapped into the gear box below the oil level and extending to said cylinder, a lube line extending from the cylinder to at least one bearing, and means to repeatedly operate said cylinder to deliver oil to the bearing.

2. The device of claim 1 wherein the cylinder is a single action cylinder and further comprising means to automatically reset said cylinder after each operation.

3. The device of claim 2 wherein the cylinder has a vertically disposed piston rod and the resetting means includes a counterweight attached to said piston rod so that said counterweight pulls said piston rod down to reset said cylinder.

4. The device of claim 1 wherein the lube line and the supply line each has means to restrict oil flow in one direction.

5. The device of claim 4 wherein the supply line has a check valve to restrict oil flow towards the gearbox and the lube line has a check valve to restrict oil flow towards the cylinder.

6. The device of claim 1 wherein the materials handling device has means performing repetitive operations and further comprising means to connect the cylinder in a slave relationship to any of said repetitive performing means.

7. The device of claim 1 wherein said cylinder is pneumatically operated.

8. The device of claim 1 wherein each of said motors has a clutch to individually disengage it from driving relationship with the rotating shaft.

9. The device of claim 1 further comprising means to individually change the effective drive speed of the motors.

10. The device of claim 1 wherein the device has means to connect the cylinder in a lubricating relationship to a plurality of separate lubricated machine elements.

* * * * *